US006836667B1

(12) United States Patent
Smith, Jr.

(10) Patent No.: US 6,836,667 B1
(45) Date of Patent: Dec. 28, 2004

(54) METHOD AND APPARATUS FOR A WIRELESS TELECOMMUNICATION SYSTEM THAT PROVIDES LOCATION-BASED MESSAGES

(75) Inventor: Harold R. Smith, Jr., Oakbrook Terrence, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 430 days.

(21) Appl. No.: 09/664,091

(22) Filed: Sep. 19, 2000

(51) Int. Cl.$^7$ ................................................. H04Q 7/20
(52) U.S. Cl. .................................. 455/456.1; 455/456.3
(58) Field of Search ............................. 455/456.1, 466, 455/412.1, 414.2, 456.3, 412.2

(56) References Cited

U.S. PATENT DOCUMENTS

| 6,091,959 | A | * | 7/2000 | Souissi et al. | |
| 6,115,611 | A | * | 9/2000 | Kimoto et al. | 455/456.3 |
| 6,381,465 | B1 | * | 4/2002 | Chern et al. | |
| 6,505,046 | B1 | * | 1/2003 | Baker | |

FOREIGN PATENT DOCUMENTS

WO      97/41654      11/1997

* cited by examiner

Primary Examiner—David Hudspeth
Assistant Examiner—Huy Nguyen

(57) ABSTRACT

A wireless telecommunication system receives information from a wireless mobile unit associated with a category of information (such as "shopping" for example); and determines that the wireless mobile unit has entered a region including a site associated with the category of information (such as a shopping mall, for example). Information specific to the site and category is then received at a centrally located location-based message server. As the traveler enters the region including the mall, for example, the wireless mobile unit then receives information specific to the site and category such as information relating to sales at the mall. Alternatively, information relating to a category and site received, and all wireless mobile units within a region including the site are then identified so that the received information relating to the category can be output thereto. As such, desired information specific to a region occupied to a traveler is received.

60 Claims, 4 Drawing Sheets

METHOD AND APPARATUS FOR A WIRELESS TELECOMMUNICATION SYSTEM THAT PROVIDES LOCATION-BASED MESSAGES

BACKGROUND OF THE INVENTION

1. Field of the Invention

The present invention relates to telecommunications in general, and, more particularly, to a wireless telecommunications system.

2. Description of Related Art

FIG. 1 depicts a schematic diagram of a portion of a known wireless telecommunications system, providing wireless telecommunications service to a number of wireless mobile units (e.g., wireless mobile units 101-1 through 101-3) that are situated within a geographic region. The heart of a typical wireless telecommunications system is a wireless switching center ("WSC") 120. Typically, the WSC 120 is connected to a plurality of base stations (e.g., base stations 103-1 through 103-5) that are dispersed throughout the geographic region serviced by the system and to the local and long-distance telephone and data networks (e.g., local-office 130, local-office 138 and toll-office 140). WSC 120 is responsible for, among other things, establishing and maintaining a call between a first wireless mobile unit and a second wireless mobile unit or, alternatively, between a wireless mobile unit and a wireline mobile unit (e.g., wireless mobile unit 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon. In practice, however, each cell has an irregular shape that depends on the topography of the terrain surrounding the cell. Typically, each cell contains a base station, which comprises the radios and antennas that the base station uses to communicate with wireless mobile units in that cell and also comprises the transmission equipment that the base station uses to communicate with the WSC 120. However, locating wireless mobile units within a cell was often difficult.

Prior art FIG. 2 illustrates a base station 203 and the typical coverage area of a three sector antenna typically utilized on a base station 203. Since the base station antenna typically has three sectors (which are typically 3 separate antennas), each of the three sectors covers about a 1200 area of the cell 205. These three sectors, labeled 207a, 207b, and 207c each correspond to one of the three sector antennas of base station 203.

When a wireless mobile unit 210 is turned on, the nearest cell site or base station such as base station 203 becomes aware of its location in terms of antenna face or sector direction. Thus, the base station 203 is not only aware of wireless mobile unit 210, but it is also aware that the wireless mobile unit 210 is within a particular sector of its coverage region, such as sector 207a. Hence, the base station 203 knows the approximate geographic location of wireless mobile unit 210. This method of locating a wireless mobile unit 210 requires only one cell site or base station 203, although the area covered by the sector could be quite large.

Prior art FIG. 3 depicts a known triangulation technique for locating the wireless mobile unit 310. Using this triangulation technique, three base stations 303a, 303b, and 303c are used to pinpoint the location of wireless mobile unit 310.

A propagation delay between the wireless mobile unit 310 sending a message to each of the three base stations 303a, 303b, and 303c is used to determine the distance to the wireless mobile unit 310, such as distance X, distance Y and distance Z as shown in prior art FIG. 3. Triangulation requires the cell sites to be synchronized to a reference clock so when the wireless mobile unit 310 contacts each of base stations 303a, 303b, and 303c, a time stamp of when the message was received is created. Then, the time stamps are compared and used to determine the exact location using radio wave propagation characteristics and some rudimentary mathematics. This method requires three cell sites for accurate positioning.

Further, global positioning systems (GPS) have recently been developed to the point where they are cheap to implement. Thus, such systems may soon be prevalent in wireless mobile units to determine the precise location thereof. In addition, in an area of wireless technology, assisted GPS is being developed to improve on normal GPS for position or location detection of wireless mobile units. In addition, other position determining systems are constantly being developed. Thus, with all these various ways being developed to locate a wireless mobile unit and to pinpoint the location of the wireless mobile unit, a need exists to create other uses for the location or position information of wireless mobile units.

Still further, as wireless units travel from region to region, a user might find information specific to the particular region to be quite useful. For example, weather warnings, traffic problems or other road problems, if received by the user, would allow the user to take appropriate action. Knowing about traffic accidents on major highways or roads closed for construction would enable the user to find an alternate route to avoid the problem. Thus, a need exists for getting region-specific information to a user.

SUMMARY OF THE INVENTION

The present invention is directed to a wireless telecommunication system or method that uses location or position information of a wireless mobile unit to enable the sending of messages to travelers. As it is determined that the wireless mobile unit has entered a region for example, information specific to the region is output for the wireless mobile unit (information which is eventually output to the wireless unit via a base station, for example). In another embodiment, a determination is made that information should be broadcast in a region; wireless mobile units located within the region are identified; and information is broadcast to the wireless mobile units located in the region. As such, information specific to that of a region is output to users within the region so that they can make use of the information in a timely manner.

BRIEF DESCRIPTION OF THE DRAWINGS

The present invention will become more fully understood from the detailed description given herein below and the accompanying drawings which are given by way of illustration only, and thus are not limitative of the present invention, wherein like reference numerals represent like elements and wherein.

DETAILED DESCRIPTION

The various aspects of the present invention enable the use of both telecommunications capability and regional location-finding capability of a wireless telecommunication system to disseminate region related information to wireless mobile units within the region associated with a category information. In one preferred embodiment, information is received from the wireless mobile unit; it is determined that the wireless mobile unit has entered a region including a site associated with the category, and location-specific information relating to the category, such as sports scores when a wireless mobile unit enters a sporting complex or sale information when a wireless mobile unit enters a shopping area, etc., for example, is output to the wireless mobile unit upon determining that the wireless mobile unit has entered the region. This information is eventually output to the wireless mobile unit via a base station, for example. In another embodiment, it is determined that information should be broadcast within a region of a wireless communication network. Categories of information are broadcast in regions including sites associated with the categories. Information relating to a category is broadcast to wireless mobile units both associated with the category and located within the region. Thus, information specific to sites within the region is output to the wireless mobile units located within the region, desiring such information.

As such, information of specific use to a user, such as information intimately related to the region wherein the user is located, is easily disseminated to the user. Therefore, advances in location-based technology, which more and more accurately identify the location or precise position of a user, are utilized in a timely and specific manner to allow users to receive information specific to the region or specific place (such as a sporting arena, store, etc.) in which they are located or which they are approaching (in route to the sporting area, store, etc.); or provide users with more information about the region itself.

Figure 1:
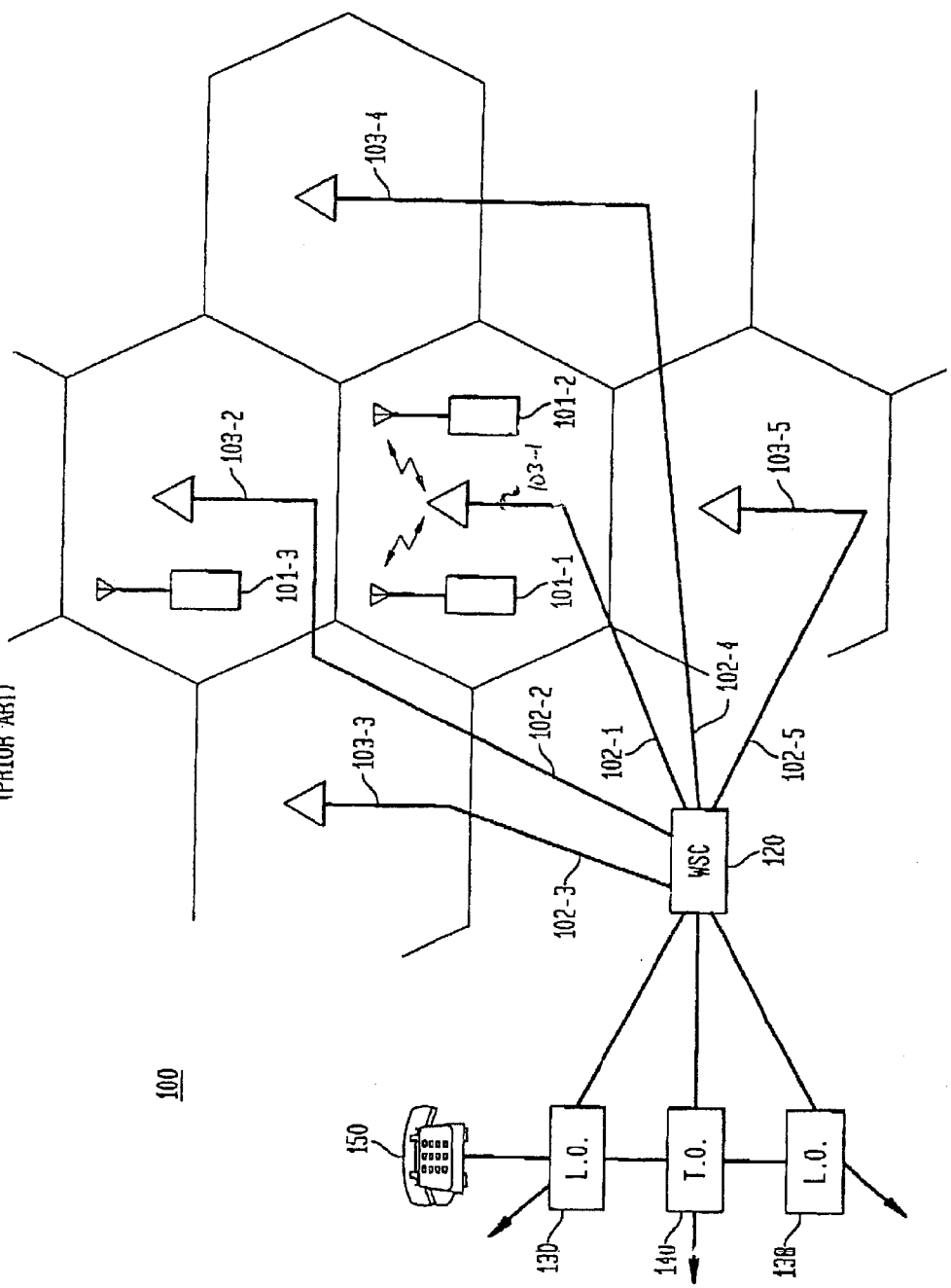
FIG. 1 is a schematic diagram of a known wireless telecommunication system.
Figure 2:
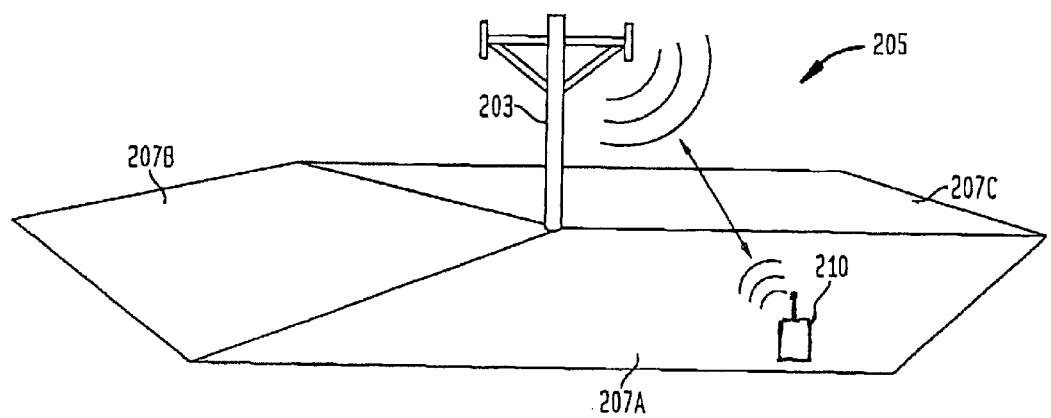
FIG. 2 is a diagram of area sectors covered by base stations in a wireless network.
Figure 3:
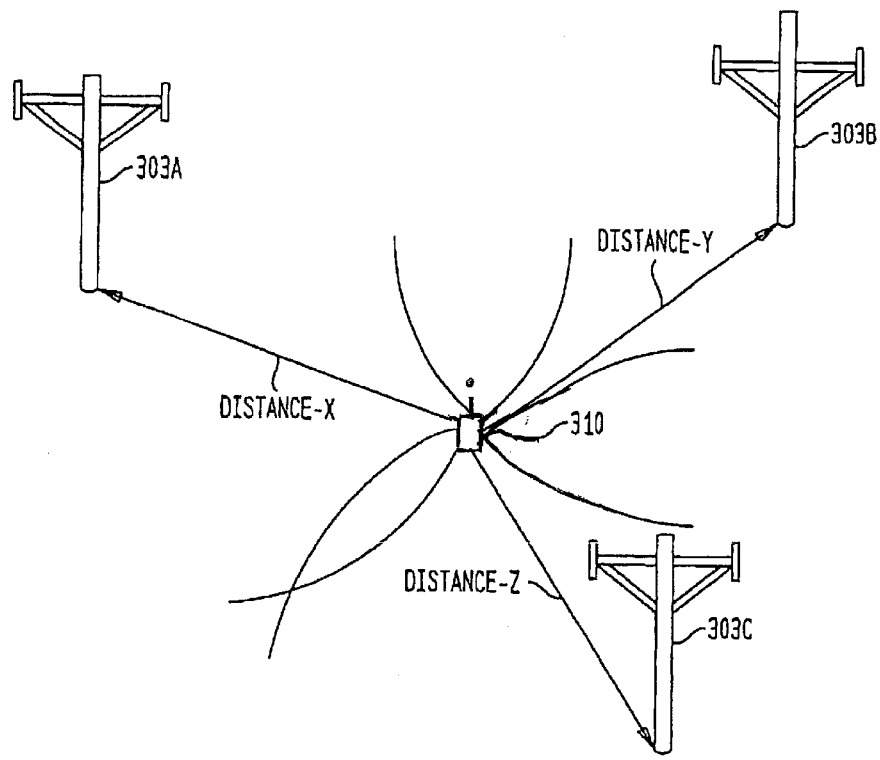
FIG. 3 is a diagram of the use of triangulation to locate a wireless mobile unit.
Figure 4:
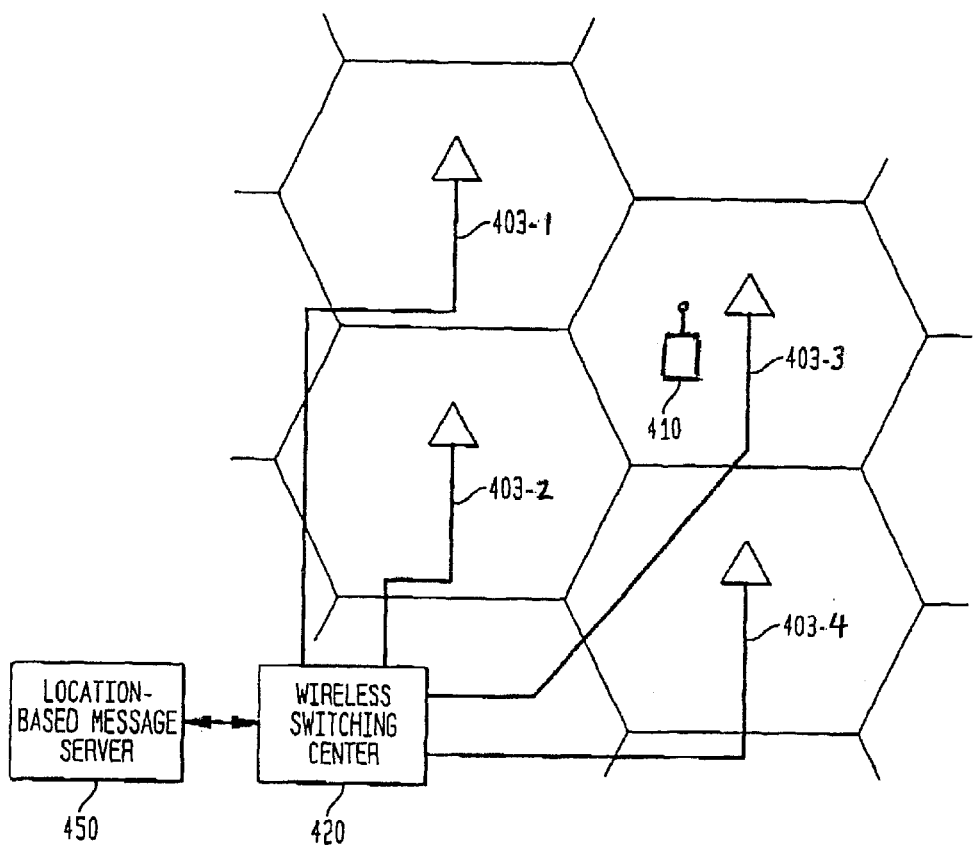
FIG. 4 is a schematic diagram of a wireless telecommunication system including the location-based message server of an embodiment of the present invention.

FIG. 4 is a schematic diagram of a wireless telecommunication system including a location-based message server 450 of a preferred embodiment of the present invention. The system includes a wireless switching center (WSC) 420 connecting the location-based message server 450 with base stations 403-1 through 403-4, wherein it is understood that the number of base stations is exemplary only. Such a system is capable of: (1) providing wireless telecommunication service to the wireless mobile unit 410, including location-based services based on location of the wireless mobile unit 410; (2) monitoring the movement (changing location from region to region or cell to cell for example, or approximate to or within a site including a microcell, for example, such as a sports complex, store, garage, etc.) of wireless mobile unit 410 as it remotely changes location; and (3) providing location-based or region-based information back to the wireless mobile unit 410 through WSC 420 and through base stations 403-1 through 403-4, based on the observed changing location or entrance of the wireless mobile unit 410 into different cells or regions or into specific sites. The location-based message server 450 is responsible for providing all location-based message services for the wireless mobile unit 410.

Figure 5:
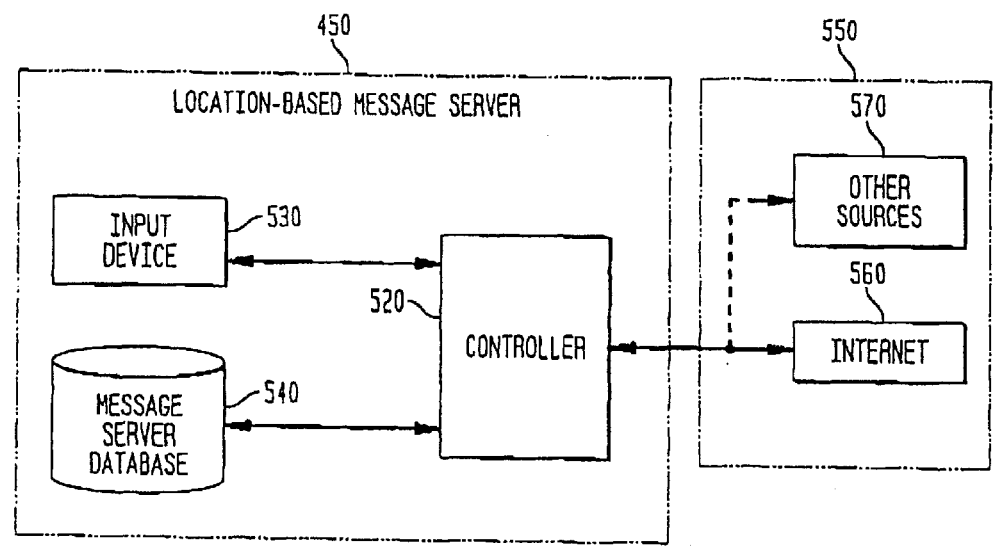
FIG. 5 is a block diagram of the salient component of the location-based message server of FIG. 4 and connections to external devices.

FIG. 5 is a block diagram of the salient components of location-based message server 450. The location-based message server 450 includes a controller 520. The controller 520 is connected to each of a message server database 540; and an input device 530. It should be understood that controller 520 of location-based message server 420 sends and receives signals and other information to and from the wireless mobile unit 410, through WSC 420 and base-stations 403-1 through 403-4 shown in FIG. 4 (although not repeated in FIG. 5 for clarity), and to and from external sources 550 (such as the internet 560). The input device 530 can be any input device such as a keyboard, mouse, etc. for inputting information to controller 520, and for storage in message server database 540. The controller 520 is, for example, computer programmed to orchestrate location-based message services, for a plurality of geographic regions such as those serviced by wireless switching center 420, wherein the services include sending information back to the wireless mobile unit 410 through WSC 420 and the base stations, such as information relating to specific sites (such as sports scores, sale information, etc.). The controller 520 controls the operation of other elements in the location-based message server 450.

The message server database 540 is a database or memory that contains, among other things, digitized maps of geographic areas or regions such as those within a particular cell serviced by a base station for example, preferably including digitized maps of a plurality of geographic areas or cells, such as those served by wireless switching center 420. These maps are used by controller 520 for comparison purposes with a current location of wireless mobile unit 410 to determine whether or not the wireless mobile unit 410 is within a specific geographic region, or within a specific site; is within a region neighboring (proximate to) a particular geographic region or site; or is within a certain event triggering distance of a site. The maps and such within message server database 540 are further used for comparison to information received by controller 520 from an external source 550, such as the Internet 560 or other external services 570, for determination by the controller 520, of events within the region; and/or for determination of alternate routes within the geographic region based upon information being received from external source 550 indicating a problem within a particular geographic region. The geographic data and related data may be embodied in a Geographic Information System (GIS), for example. Further, although controller 520 of location-based message server 450 is shown directly connected to external sources 550 in FIG. 5, such a connection could be indirect through WSC 420 or even wireless through base stations 403-1 to 403-4, for example.

Message server database 540 further preferably contains not only the GIS database, but also GIS processing software that enables geographic functions, chiefly determining relationships between various geographic regions in the position or location of wireless mobile unit 410 enabling the functionality described herein as will be explained in more detail hereafter. Some personal preferences may also be established in message server database 540 which may create an understanding for the processing of information such as particular regions or sites frequently used or visited by a user of wireless mobile unit 410; specific types or categories of information desired to be received such as "sale" or "sports" information for example; information identifying the wireless mobile unit 410 as a subscriber to a service desiring dissemination of the information disseminated by the present invention; etc. These can be established and stored as a user profile, along with information identifying the wireless mobile unit 410, in message server database 540.

Setting a trigger to activate the system when wireless mobile units 410 are within/neighboring/or proximate to a designated region is a presettable option and can be modified in any way desired as would be understood by one of ordinary skill. Thus, thresholds for triggering retrieval and outputting of information can be set for proximate (10 mile, 5 mile, 1 mile, etc.) distances from a site (mall, sports stadium, etc.), or for activation within a site.

The external information sources 550, including the Internet 520 and other sources 570, will generally be established separately from message server database 540, but in a manner consistent therewith. Information can be requested in a specific manner or in an ongoing basis from controller 520 accessing any external source 550 through WSC 420, for example. As such, current/updated information corresponding to any preregistered category of information can be obtained by controller 520 from external source 550 (such as the internet for example).

Message server database 540 further preferably contains a registration list of services to be performed (categories of information to be sent) in association with information identifying a wireless mobile unit 410 and the geographic area (places/events/stores/etc.) that will be considered to meet a criteria for initiating the services to be performed (registered sites that will trigger the retrieval of a designated category of information). It further contains links, associated with the categories, to access (either from message server database 540 or from external sources 550) information related to the categories (sports scores for example). These can be customized by the user and can also be part of a user profile. It should be noted that this information can be stored information stored and retrieved from message server database 540, or can be information stored and retrieved from an external source 550; such as the internet 560.

For example, the service which might be desired by a user might be that of receiving an indication of information within a geographic region such as a sports scores at or proximate to a sports arena, sales information at or proximate to a shopping mall, available parking in a parking garage, etc. for any one of a plurality of geographic regions. Thus, the controller 520 will receive information to locate wireless mobile units 410 within (or proximate to) the geographic region subscribing to such a service; will retrieve current/updated information corresponding to the particular information category from message server database 540 or an external source 550; and will output the retrieved information to all subscribing wireless mobile units 410 located within (or proximate to) the geographic region.

Additionally, if the wireless mobile unit 410 desires to receive information specific to a region, it can subscribe to this service such that when the wireless mobile unit 410 has entered the region, information relating to the region such as sports scores or sale information (for example) will be retrieved and sent to the wireless mobile unit 410. This can then be output based upon a wireless mobile unit 410 merely transponding a pilot signal back to a base station in a known manner, to thereby enable the base station and thus controller 520 to locate that a wireless mobile unit 410 has entered a particular geographic region, including a site associated with a desired category of information; or it can be based upon a signal received from a wireless mobile unit 410, indicating that the wireless mobile unit 410 desires this type of information relating to a category of information—preregistered and associated with the wireless mobile unit 410, wherein the controller 520 will thereafter determine that a wireless mobile unit 410 has entered a particular geographic region including a site associated with a desired category of information and will retrieve and output or broadcast information relating to the particular geographic region to the wireless mobile unit 410. A "geographic region" can be designated as a cell, for example, can be a region containing a microcell such as a sports stadium, shopping mall, parking garage, or can be any other designatable region.

Controller 520 can also include a location determining server (not shown) for determining a location of a wireless mobile unit 410 when requested to do so by controller 520 to provide controller 520 with that information when it is obtained. The location determining server can be part of controller 520 or can be a separate component in location-based message server 450 for determining location.

It should be noted that the location of wireless mobile unit 410 can be determined in a number of known ways including using information received from a wireless mobile unit 410 itself (through a base station and WSC 420, eventually reaching location-based message server 450) based upon a global positioning system (GPS) or assisted GPS used in conjunction with the wireless mobile unit 410 and signals 506 sent therefrom; or based upon and other known techniques such as cell or sector location or triangulation techniques achieved at a base station, wherein the base stations then transmit the location of wireless mobile unit 410 to location-based message server 450 via wireless switching center 420. How the location information is obtained is not limitative of the present invention. Controller 520, in conjunction with message server database 540 and with other location-based determining techniques or a location determining server, determines the identification of wireless mobile units within or entering a particular region (or neighboring or proximate to a particular region) and monitors the units and information received from external source 550.

As previously stated, the location or position of wireless mobile unit 410 may be obtained in a plurality of ways. The wireless mobile unit 410 may contain the functionality needed to locate itself, and may send results to a signal 506 to the location-based message server 450; such as through GPS or modified GPS circuitry within the wireless mobile unit 410 itself. Alternatively, the location or position can be determined in a known manner through triangulation, base station sector information, etc. at the location-based message server 450 or WSC 420. Those familiar with wireless location technology/functioning will recognize that for the services disclosed therein, it does not matter whether geographic location or position results are calculated in the network or in the wireless mobile unit 410 itself.

Figure 6:
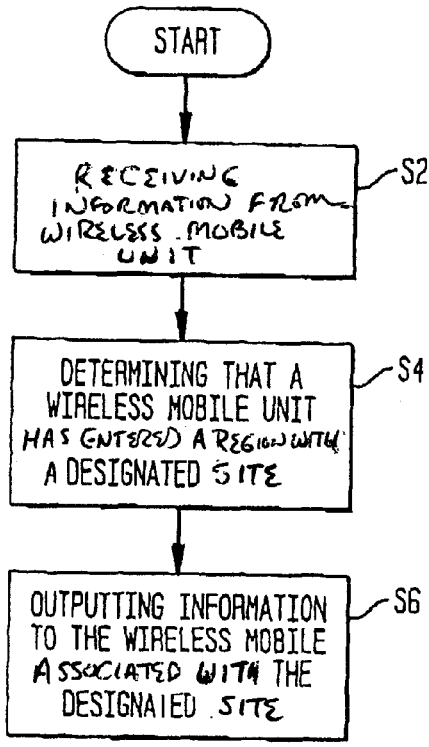
FIG. 6 is a flowchart illustrating a method of operation of a first embodiment of the present application.

FIG. 6 is a flowchart of the operation of one preferred embodiment of the present application.

Initially, prior to step 2, a user of a wireless mobile unit 410 registers for the service by designating one or a plurality of categories of information which he/she desires to receive. This can be done by configuring a user profile for storage in message server database 540 for example. The information categories can include sports scores for receipt when wireless mobile unit 410 enters or is proximate to a sports complex; sale information when the wireless mobile unit 410 enters or is proximate to a shopping mall; parking information when the wireless mobile unit 410 enters or is proximate to a parking garage; etc.; or even an "all of the above" category where all categories of registered relevant information will be sent when the wireless mobile unit 410 enters or is proximate to a particular place (with the information being related to the particular place, associated with a category). This registration information is stored in message server database 540 for example. As such, categories of information to be output or broadcast are stored in association with sites associated with the categories; user information identifying the wireless mobile unit; and information used to retrieve information corresponding to the categories.

Similarly, sites associated with categories (triggers for information retrieval and output) such as stadiums, restaurants, parking garages, shopping malls, etc. will also be stored in message server database 540. These sites will be determined based upon cell location or microcell location, for example, and will be stored in association with related categories of information to be output. Thus, if a user desires to receive sports scores at or proximate to a sporting complex, the cell or microcell location of the sports complex will be stored in association with a sports score retrieval category, to act as a trigger. Accordingly, when a wireless mobile unit 410 of a user, registered to receive sports scores, enters (or is proximate to) a sports complex, the controller 520 will access external source 550 to obtain current sports scores (or will receive stored information from message server database 540) and will output this information to wireless mobile unit 410. This will be explained as follows.

In Step S2, information is received from a wireless mobile unit 410 (associated with at least one category of information), through a controlling base station and WSC 420, at location-based message server 450. This information can be merely that of a wireless mobile unit 410 transponding a received pilot signal to a base station thereby indicating that a wireless mobile unit 410 is within a region or sector of a base station (or microcell); can include a specific signal for determining a location of a wireless mobile unit 410 such as a GPS or assisted GPS signal; or can include a specific request for information from a wireless mobile unit 410.

Thereafter, in Step S4, based upon this received information, it is determined that a wireless mobile unit 410 has entered a region including a site associated with a category of information desired to be retrieved by the user of the wireless mobile unit 410 (a registered category associated with the wireless mobile unit 410). In other words, it is determined whether or not the user has entered (or is proximate to) a site that is associated with (or that will act as a trigger for) a designated (registered) category of information for that wireless mobile unit 410. For example, if the wireless mobile unit 410 transponds a signal back to a particular base station, the location-based message server 450 then knows the particular region or sector that the wireless mobile unit 410 has entered. Thus, this identifies the location for that particular wireless mobile unit 410. Based upon stored categories associated and stored with information identifying that wireless mobile unit 410 (the phone number or another identifying number such as the serial number for example), and based upon stored sites corresponding to and stored in association with information categories, the location based message server 450 determines whether or not a wireless mobile unit 410 has entered a region with a designated or triggering site for triggering the retrieval of information desired by the user of the wireless mobile unit 410 (or alternatively has entered to a region neighboring, such as when the wireless mobile unit 410 is proximate to or within a preset distance threshold, a region with a triggering site).

Finally, in Step S6, information is retrieved and output from location-based message server 450 for the wireless mobile unit 410 relating to the designated region and corresponding information category. This information is then retrieved and output to the wireless mobile unit 410 via the WSC 420 and controlling base station, for example, upon determining that the wireless mobile unit 410 has entered a region including a site associated with the corresponding information category. This information is retrieved based on information stored in association with the category (such as information indicating that information should be retrieved from a particular website, for example). Depending on a particular service that a user has signed up for or depending on the type of information provided by location-based message server 450 and desired by the user, information such as sports scores, purchases, sales, etc., for the region; particular information associated with the designated region etc., are retrieved and output for, and eventually to the wireless mobile unit 410. Information can then be output at the wireless mobile unit 410 in any number of ways, including but not limited to audibly and visually. A visual display can include on the wireless mobile unit 410 itself, or to a display unit connected thereto, for example.

As previously stated, the information output for the wireless mobile unit 410 can be that of purchasing or sales (shopping) sale information, such as "One day 50% off sale now at store XXX", for example. For example, controller 520 can either access an external information source 550 at a stored location associated with a desired category of information, or it can constantly receive sales information from an external information source 550, such as the Internet 560. Based upon mapping information stored in message server database 540, the controller 520 can then essentially parce the information received into various sectors of regions (as defined by the parameters of the system), or can receive only information related to a plurality of geographic regions or a single geographic region. As such, information specific to the geographic region, such as sales information for stores located within a certain number of preset miles of the wireless mobile unit 410 or within the cell of the wireless mobile unit 410; information relating to sports scores when the wireless mobile unit 410 is within a number of preset miles of the sports complex, or within a micro cell of a sports complex; other problems within the region such as lack of parking spaces in a parking garage, etc. can be output to the wireless mobile unit 410.

Other types of information that could be provided to the wireless mobile unit 410 relating to the designated region or neighboring region can include parking, traffic, weather, and other "real-time" conditions. For example, relating to retail shops or malls for example, customer or user profiles for users of wireless mobile units can be stored in message server database 540. The profiles may include, for example, specific items a user likes to shop for, such as sporting goods, for example. Then, as a wireless mobile unit 410 of a user enters a region or cell containing stores matching the profile, such as sporting goods stores for example, information is retrieved and output to the wireless mobile unit 410 indicating sales for such stores within the region.

Figure 7:
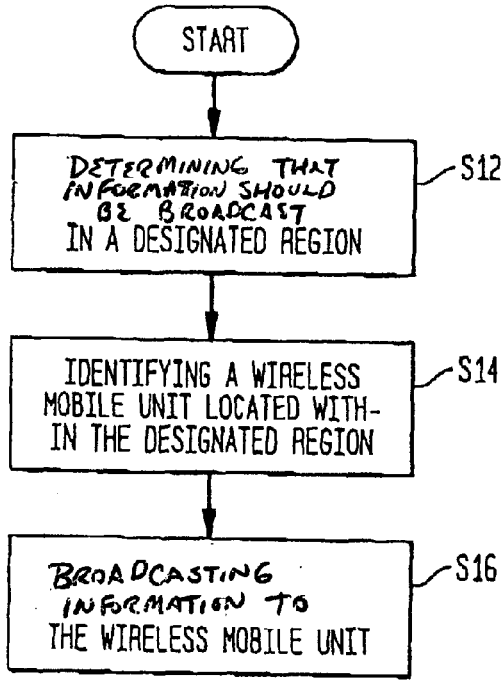
FIG. 7 is a flowchart illustrating the method of operation of a second embodiment of the present application.

A second embodiment or aspect of the present application is shown in FIG. 7. In this aspect, message server database 540 stores categories (at least one category) of information to be broadcast in a region including a site associated with a category. Some determination is made by controller 520 based on received information, time of day, etc., that information should be broadcast in a region including a site associated with a stored category in Step S12. The information could be that relating to a store which desires its "sales" to be broadcast to all wireless mobile units 410 within a cell region of a store (or a neighboring region), for example. The controller 520 then determines the particular region in which the site is located, through the use of the information message server database 540 for example. Thereafter, a wireless mobile unit 410, or a plurality of wireless mobile units subscribing to receive "sales" category information (for example) as stored in location-based message server 450, which are located within the designated region (and/or a neighboring region), are identified in Step S14. Thereafter, information relating to the category (sale) is retrieved and broadcast for, and eventually to the wireless mobile unit 410 or a plurality of wireless mobile units within the designated region in Step S16.

As previously stated, information (such as "sales" information) can be designated (determined) to be output based on "time of day". Thus, at 12 noon on Saturday or Sunday for example, sales information of a store is broadcast to all wireless mobile units 410 desiring such information (associated with the "sale" category) and located within (or proximate to) a designated region (a region containing the store or "site"). Similarly, information such as sports scores can be sent everyday at 7 p.m. (for example) to those located within or proximate to a sports stadium or sports bar, or any other designatable site stored in association with a sports score category.

Still further, other triggering events can be used such as determining that a wireless mobile unit 410, associated with a category, has entered a site associated with the category. For example, a determination can be made indicating that a wireless mobile unit 410, associated with a stored category, has entered a region including a site associated with a stored category (a wireless mobile unit desiring to receive "sale" information, enters a region including a shopping mall, for example). Upon this "triggering" event occurring, information relating to the category ("sale" information) is broadcast to the wireless mobile unit.

It should be understood that various aspects previously discussed regarding the first embodiment equally apply to the second embodiment for example, etc. Thus, these aspects will not be repeated for the sake of brevity.

The invention being thus described, it will be obvious that the same may be varied in many ways. For example, designated regions can be any particular defined area, such as cells, microcells, or cell sectors for example. Further, information and sites and categories are not, and should not be limited to that discussed in the application wherein categories of information such as sales and sports scores, as well as sites including shopping malls and sports complexes, were meant to be exemplary only.

For example, the information, sites and categories can include those requiring map information such as a parking garage. In such an instance, the map information can be retrieved from an external source (such as the internet for example) and can be sent to the wireless mobile unit 410 of a user upon entering or being proximate to the parking garage. Such map information can indicate available parking spaces, for example. In addition, the information sent to the wireless mobile unit 410 can include text and/or picture information, such as ads of a store, for example.

In addition, the information sent to the wireless mobile unit 410 can be used to trigger additional functions. For example, the information received at or output to the wireless mobile unit 410 can be used to vary the destination of a specified common dialing pattern, such as "wow" or "777" for example. Thus, if sports information is received, for example, then the telephone number corresponding to "wow" can be that of a local sports radio program, and if the information is sales information, the telephone number corresponding to "wow" can be that of a local retailer for example. This can be achieved by simple programming and table look-up features.

Still further, the information output or received by the wireless mobile unit 410 can be tracked. Such tracked information can be used in billing calculations, such as billing for advertisers, for example, or for other purposes.

Such examples and other variations are not to be regarded as a departure from the spirit and scope of the invention. All such modifications as would be obvious to one of ordinary skill in the art are intended to be included within the scope of the following claims.

What is claimed is:

1. A location-based messaging method in a wireless communication network comprising:

receiving information from a wireless mobile unit associated with at least one category of information;

determining that the wireless mobile unit has entered a region having located therein an establishment associated with the at least one category of information, based upon the information received from the wireless mobile unit, the determining step not being triggered by input from a user of the wireless mobile unit; and outputting information relating to the at least one category, in response to determining that the wireless mobile unit has entered the region having located therein an establishment associated with the at least one category.

2. The location based messaging method of claim 1, further comprising:

storing information associating at least one category of information with at least one establishment.

3. The location-based messaging method of claim 1, wherein the output information is output to the wireless mobile unit.

4. The location-based messaging method of claim 1, wherein the output information includes sports information.

5. The location-based messaging method of claim 1, further comprising:

determining a location of the wireless mobile unit, wherein the location is used to determine that the wireless mobile unit has entered a region having located therein an establishment associated with the at least one category of information.

6. The location-based messaging method of claim 1, further comprising:

storing information associating the wireless mobile unit with at least one category of information and storing information associating the at least one category of information with at least one establishment.

7. The location-based messaging method of claim 1, wherein the output information includes purchasing information.

8. The location-based messaging method of claim 1, further comprising:

storing a plurality of categories of information relevant to a user of the wireless mobile unit, wherein information associated with one of the plurality of categories is output upon the wireless mobile unit entering a region having located therein an establishment associated with the one of the plurality of categories.

9. The location-based messaging method of claim 8, wherein the at least one of the stored categories of information includes shopping and the output information includes shopping information relating to stores corresponding to the shopping category.

10. The location-based messaging method of claim 8, wherein the stored information includes a user profile and the output information includes information relating to at least one establishment associated with selected categories of information within the user profile.

11. The location-based method of claim 1, further comprising:
retrieving information associated with the at least one category upon determining that the wireless mobile unit has entered a region having located therein an establishment associated with the at least one category of information, wherein the step of outputting includes outputting the retrieved information.

12. The location-based method of claim 11, wherein the information is retrieved from an external source.

13. The location-based method of claim 12, wherein the information is retrieved from the internet.

14. The location-based method of claim 12, wherein the information retrieved includes map information.

15. The location-based method of claim 14, wherein the map information includes map information of a parking garage.

16. The location-based method of claim 12, wherein the information retrieved includes at least one of picture and text information.

17. The location-based method of claim 1, further comprising:
varying an output destination of a designated dialing pattern based upon the output information.

18. The location-based messaging method of claim 17, wherein the received information includes shopping information.

19. The location-based messaging method of claim 17, wherein the received information includes sports scores.

20. The location-based method of claim 17, wherein the received information includes information retrieved from the internet.

21. The location-based method of claim 20, wherein the information retrieved from the internet includes map information.

22. The location-based method of claim 21, wherein the map information includes map information of a parking garage.

23. The location-based method of claim 20 wherein the information retrieved includes at least one of picture and text information.

24. The location-based method of claim 1, further comprising tracking the output information.

25. The location-based method of claim 24, wherein the tracked output information is used in billing calculations.

26. The location-based method of claim 25, wherein the establishment includes a sports stadium.

27. The location-based method of claim 24, wherein the establishment includes a shopping mall.

28. A location-based messaging method in a wireless communication network, comprising:
receiving information, related to at least one category associated with a wireless mobile unit, at the wireless mobile unit upon the wireless mobile unit entering a region having located therein an establishment associated with at least one of the categories of information desired to be retrieved, wherein the information is received without sending input from a user of the wireless mobile unit.

29. The location-based method of claim 28, further comprising:
varying an output destination of a designated dialing pattern based upon the received information.

30. The location-based method of claim 28, further comprising tracking the received information.

31. The location-based method of claim 30, wherein the tracked received information is used in billing calculations.

32. A location-based messaging apparatus, comprising:
a controller adapted to determine that a wireless mobile unit has entered a region having located therein an establishment associated with at least one category of information, which is associated with the wireless mobile unit; and adapted to output information relating to the at least one category, in response to determining that the wireless mobile unit has entered the region having located therein an establishment associated with the at least one category and without having received input from a user of the wireless mobile unit.

33. The location-based messaging apparatus of claim 32, wherein the output information is output to the wireless mobile unit.

34. The location-based messaging method of claim 33, wherein the external source is the internet.

35. The location-based messaging apparatus of claim 32, wherein the output information includes shopping information.

36. The location-based messaging apparatus of claim 32, wherein the output information includes sports scores.

37. The location-based messaging apparatus of claim 33, further comprising:
a memory, adapted to store information associating the at least one category of information with the wireless mobile unit and information associating at least one establishment with the at least one category.

38. The location-based messaging apparatus of claim 32, wherein the controller is adapted to receive information relating to the at least one category from an external source, and wherein the received information is output to the wireless mobile unit.

39. The location-based messaging apparatus of claim 38, wherein the received information includes shopping information.

40. The location-based messaging apparatus of claim 38, wherein the information received includes sports scores.

41. The location-based messaging apparatus of claim 38, wherein the received information includes map information.

42. The location-based messaging apparatus of claim 41, wherein the map information includes map information of a parking garage.

43. The location-based messaging apparatus of claim 38, wherein the received information includes at least one of picture and text information.

44. The location-based messaging apparatus of claim 32, wherein the controller is further adapted to vary an output destination of a designated dialing pattern based upon the output information.

45. The location-based messaging apparatus of claim 32, wherein the controller is further adapted to track output information.

46. The location-based messaging apparatus of claim 45, wherein the tracked output information is used in billing calculations.

47. The location-based messaging method of claim 32, wherein the information is retrieved from an external source.

48. The location-based method of claim 47, wherein the information retrieved includes map information.

49. The location-based method of claim 48, wherein the map information includes map information of a parking garage.

50. The location-based method of claim 47, wherein the information retrieved includes at least one of picture and text information.

51. The location-based messaging method of claim 32, wherein the retrieved information includes shopping information.

52. The location-based messaging method of claim 32, wherein the retrieved information includes sports scores.

53. A location-based messaging method in a wireless communication network, comprising:

storing at least one category of information to be broadcast in a region having located therein an establishment associated with the category;

broadcasting information, related to at least one stored category, to at least one wireless mobile unit, both associated with at least one stored category and determined as located in the region, without having received input from a user of the wireless mobile unit.

54. A location-based messaging method of claim 53, wherein the step of broadcasting information includes broadcasting at a preset time of day.

55. The location-based messaging method of claim 53, further comprising:

determining that a wireless mobile unit, associated with at least one stored category, has entered a region including an establishment associated with at least one stored category, wherein the information is broadcast to the wireless mobile unit upon making the determination.

56. The location-based messaging method of claim 53, wherein the storing step includes storing information associating at least one wireless mobile unit and at least one category of information and storing information associating at least one category of information and at least one establishment.

57. The location-based messaging method of claim 53, further comprising:

retrieving information associated with at least one category of information, wherein the retrieved information is thereafter broadcast.

58. The location-based method of claim 53, further comprising:

varying an output destination of a designated dialing pattern based upon the broadcast information.

59. The location-based method of claim 53, further comprising tracking the broadcast information.

60. The location-based method of claim 59, wherein the tracked broadcast information is used in billing calculations.

* * * * *